United States Patent [19]

Aichinger

[11] Patent Number: 5,086,938
[45] Date of Patent: Feb. 11, 1992

[54] PILFER-PROOF CLOSURE FOR CONTAINERS AND INJECTION MOULD FOR PRODUCING THE CLOSURE

[76] Inventor: Dietmar F. Aichinger, Alteselweg 287, CH-4497 Rünenberg, Switzerland

[21] Appl. No.: 474,823
[22] PCT Filed: Feb. 7, 1989
[86] PCT No.: PCT/AT89/00011
    § 371 Date: Jul. 26, 1990
    § 102(e) Date: Jul. 26, 1990
[87] PCT Pub. No.: WO89/07557
    PCT Pub. Date: Aug. 24, 1989

[30] Foreign Application Priority Data

Feb. 16, 1988 [AT] Austria ............... A356/88
Nov. 14, 1988 [AT] Austria ............... A2783/88

[51] Int. Cl.⁵ .................. B65D 41/34; B29D 1/00
[52] U.S. Cl. .................. 215/252; 215/258; 264/318
[58] Field of Search .................. 215/252, 258; 264/318

[56] References Cited

U.S. PATENT DOCUMENTS 4,346,811  8/1982  Hilaire .
4,394,918  7/1983  Grussen .
4,469,234  9/1984  Deussen .
4,613,052  9/1986  Gregory et al. .
4,618,121 10/1986  Conti .
4,806,301  2/1989  Conti .

FOREIGN PATENT DOCUMENTS

0213742  3/1987  European Pat. Off. .
0004500 10/1979  France .
2499519  8/1982  France .
174017   7/1982  Portugal .

Primary Examiner—Stephen Marcus
Assistant Examiner—Paul A. Schwarz
Attorney, Agent, or Firm—Frishauf, Holtz, Goodman & Woodward

[57] ABSTRACT

Pilfer-proof closure for containers, having a closure cap (1) of plastic designed as a screw cap, the shell (2) of which is connected in the region of the inner circumference of the shell, via tear-off webs (7), to a pilfer-proof strip (8), the outside of which has a wall section running obliquely outwards and downwards adjoining the webs and which on its inside has a circumferential recess (11) which is open towards the lower end of the pilfer-proof strip, from the upper wall section (12) of which at least one retention member (14) extends which, when the closure cap has been screwed onto the container orifice, engages beneath an annular snap-on projection of the container arranged below the screw thread of the container, the radial depth of the circumferential recess being at least equal to the maximum width of the retention member in axial section.

14 Claims, 6 Drawing Sheets

PILFER-PROOF CLOSURE FOR CONTAINERS AND INJECTION MOULD FOR PRODUCING THE CLOSURE

FIELD OF THE INVENTION

The invention relates to a pilfer-proof closure cap for containers, such as bottles and the like, having a closure cap of plastic designed as a screw cap, and to a mold for making the closure.

Various closures have a background shell which is connected in the region of the inner circumference of the shell, via tear-off webs, to a pilfer-proof safety or indicator strip. Separation of the strip from the cap indicates that the cap was, or could have been, removed or tampered with. The strip has on its outside a wall section running obliquely outwards and downwards adjoining the webs and on its inside bears at least one retention member which extends into the inner space bounded by the pilfer-proof strip, when the closure cap has been screwed onto the container orifice. The retention member engages beneath an annular snap-on projection of the container arranged below the screw thread of the container. The pilfer-proof strip on its inside, in the region of the retention member, is formed with a circumferential recess which is open towards the lower end of the pilfer-proof strip, which runs essentially axially, and from the upper wall section of which the retention member extends.

Compared to shrink-on pilfer-proof strips, pilfer-proof strips which can be secured mechanically on containers have the advantage that it suffices for them to be pushed over the snap-on projection when the screw cap is first screwed onto the container orifice designed in accordance with the MCA standard, because, as a consequence of their elasticity, they can snap in beneath the snap-on projection, the retention member possibly bending upwards and remaining in this position. After the snapping in of the retention member of the pilfer-proof strip, the closure cap can only be unscrewed by destroying the pilfer-proof strip, and this indicates the first opening of the container.

GB-A-2 022 063 has already disclosed a closure cap which can be produced in an injection moulding operation, having a pilfer-proof strip which can be secured mechanically on the container, and in which the retention member is a circumferential bead on the inside of the pilfer strip.

From the FR-A-2 499 519 a closure cap is known, the pilfer-proof strip of which at the interior carries peripherally spaced retention fingers, which extend from the inner circumference of the pilfer-proof strip and are provided with parallel inner and outer faces. The retention fingers extend beneath the projection of the container.

The U.S. Pat. No. 4,469,234 discloses a screw cap the pilfer-proof strip of which in the cross section is formed as an inverted U having webs of unequal length, retention fingers extending from the shorter inner web downwards and having end portions bent upwards in a hook-like manner, which extend beneath the container's projection. For the application of the screw cap the retention fingers can move outwards into the interior of the inverted U.

EP-A-0 166 572 furthermore discloses a closure cap of the type stated at the outset, in which the pilfer-proof strip engages beneath the annular snap-on projection by means of retention fingers which widen downwards.

The main disadvantage of the known pilfer-proof strips explained above consists in the fact that the injection moulds which are used for producing the closure caps and open in the axial direction are of relatively elaborate construction, since, for the purpose of releasing the pilfer-proof strip from the mould, the moulds must comprise at least three parts, i.e. as seen in axial section, they must have a horizontal mould parting line at the level of the lower edge of the closure cap, a mould parting line starting from the inside edge of the pilfer-proof strip and running obliquely outwards and downwards, and a vertical mould parting line starting from the bottom section of the pilfer-proof strip in the region of the projection or projections. During the mould release operation, the mould part having the oblique mould parting line is first of all moved downwards in order to release the bottom section of the pilfer-proof strip in the region of the snap-on projection, whereupon the core is moved downwards in order to expose the inside of the closure cap and of the pilfer-proof strip. As a result, the pilfer-proof cap, which is still held by the outer mould part, can be ejected axially upwards from the latter without damaging the pilfer-proof strip. Such moulds are expensive to produce and, in addition, because of the three-stage mould release operation, limit the production rate.

THE INVENTION

It is an object to provide a pilfer-proof closure of the type stated at the outset, the closure cap of which, while retaining the advantageous capacity for axial mould release, can be produced by means of an injection mould which dispenses with the need for a mould part which can be moved vertically downwards relative to the core.

Briefly, according to the invention as known per se, the retention member has parallel inner and outer faces or, in axial section, the retention member has inner and outer faces converging downwards from the upper wall section and is preferably of triangular design. The radial depth of the circumferential recess is at least equal to the maximum width of the retention member in axial section.

This design has the advantage that the moulding section of the injection mould for the pilfer-proof strip can be constructed of only two parts, namely an outer mould part and a core adjoining the latter via the mould parting line running obliquely outwards from the underside of the pilfer-proof strip. During mould release, the aforementioned circumferential recess of the pilfer-proof strip is progressively exposed by the core, with the result that the retention finger or the retention fingers can pivot elastically outwards without risk of damage. Thus, according to a feature of the invention, direct release of the closure cap from the mould is made possible after the removal of the mould core. The invention makes it possible to use simpler and cheaper injection moulds, which have a longer life and make possible a higher production rate.

According to another feature of the invention the mould for producing the pilfer-proof closure described, has a cavity plate and a mould core which together delimit a mould cavity for the closure cap and need be moved relative to one another only in the axial direction. An axially movable stripper plate is provided which, together with the mould core, delimits a mould cavity for the pilfer-proof strip, and having an ejector mechanism for the closure cap, the mould parting line between the cavity plate and the stripper plate starting from the lower edge of the closure cap.

According to a feature of the invention, the stripper plate and the mould core adjoin one another along a common mould parting line which runs obliquely outwards and downwards from the lower inside edge of the cavity which will receive material for the pilfer-proof strip; the mould core has at least one recess for the formation of the retention member or members. This recess communicates with the mould cavity above the oblique mould parting line, starting from a shoulder of the core and, in axial section, having parallel sides or sides which converge downwards.

As known per se, a plurality of recesses arranged at a mutual circumferential interval and intended for the formation of finger-shaped retention members are preferably provided.

Thus, according to the invention, the stripper plate and the mould core form the two parts of the section for moulding the pilfer-proof strip. During mould release, by relative axial movement of the stripper plate and the core, the aforementioned circumferential recess the pilfer-proof strip is progressively exposed by the mould core, so that the retention member or members or the retention fingers can pivot elastically into the recess without risk of damage, with the result that, following the removal of the mould core, direct axial release of the closure cap from the mould is possible. The injection mould according to the invention is simple and inexpensive and guarantees a longer life and a higher production rate than the conventional moulds.

DRAWINGS

Further features of the invention are explained in greater detail below by means of exemplary embodiments and with reference to the drawings, in which.

DETAILED DESCRIPTION

Figure 1:
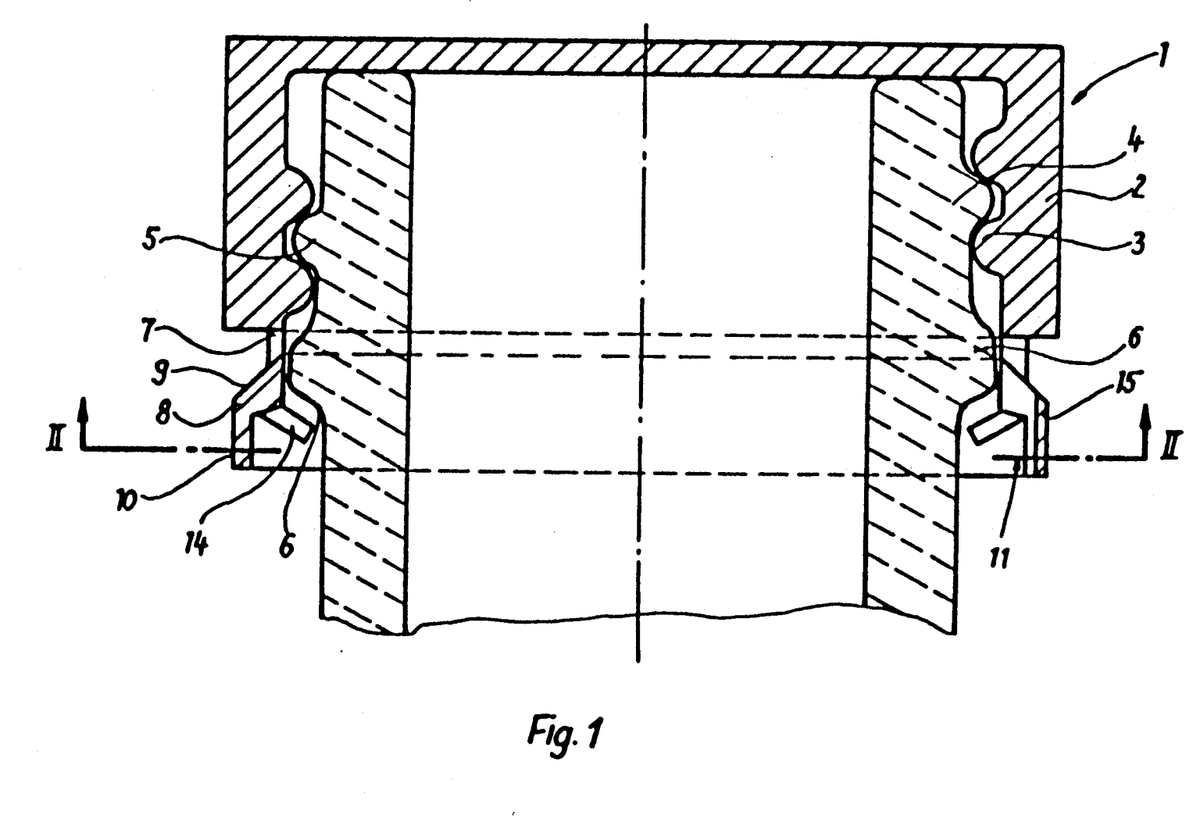
FIG. 1 shows an axial section of the pilfer-proof closure according to the invention.
Figure 2:
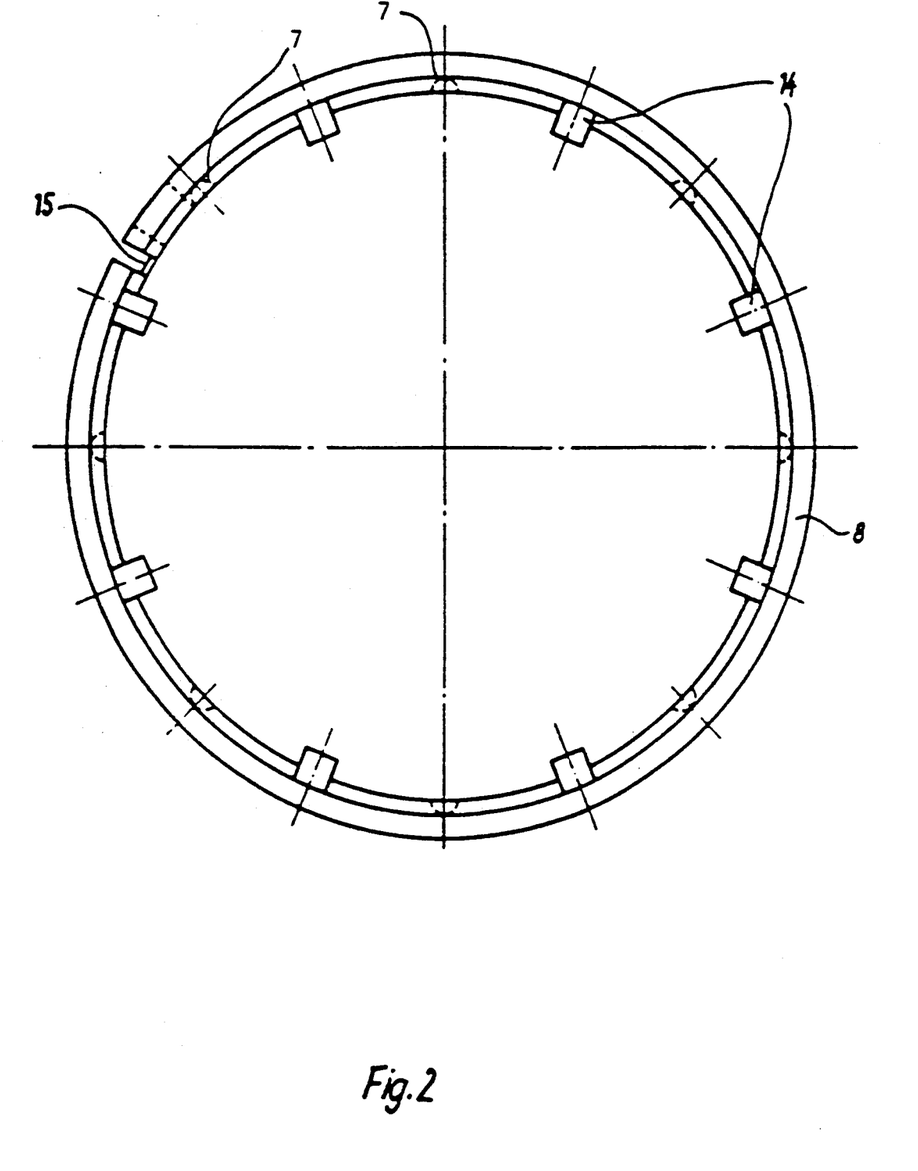
FIG. 2 shows a section along the line II—II in FIG. 1.

The pilfer-proof closure according to FIGS. 1 and 2 have a cylindrical closure cap of plastic, in particular polypropylene or polyethylene, which is designed as a screw cap 1 and, on the inside of its shell 2, is provided with a screw thread 3. The closure cap 1 is screwed onto a container orifice 4 which is designed, in particular, in accordance with the MCA standard and, on its outside, bears a screw thread 5 and, below the latter, is provided with an annular snap-on projection 6 in the form of a bead.

A pilfer-proof strip 8 produced integrally with the closure cap is secured on the lower end of the shell 2 of the closure cap 1 via a series of vertical tear-off webs 7. The webs 7 and the upper section of the pilfer-proof strip essentially have an inside diameter identical to or slightly greater than that of the shell 2.

Figure 3:
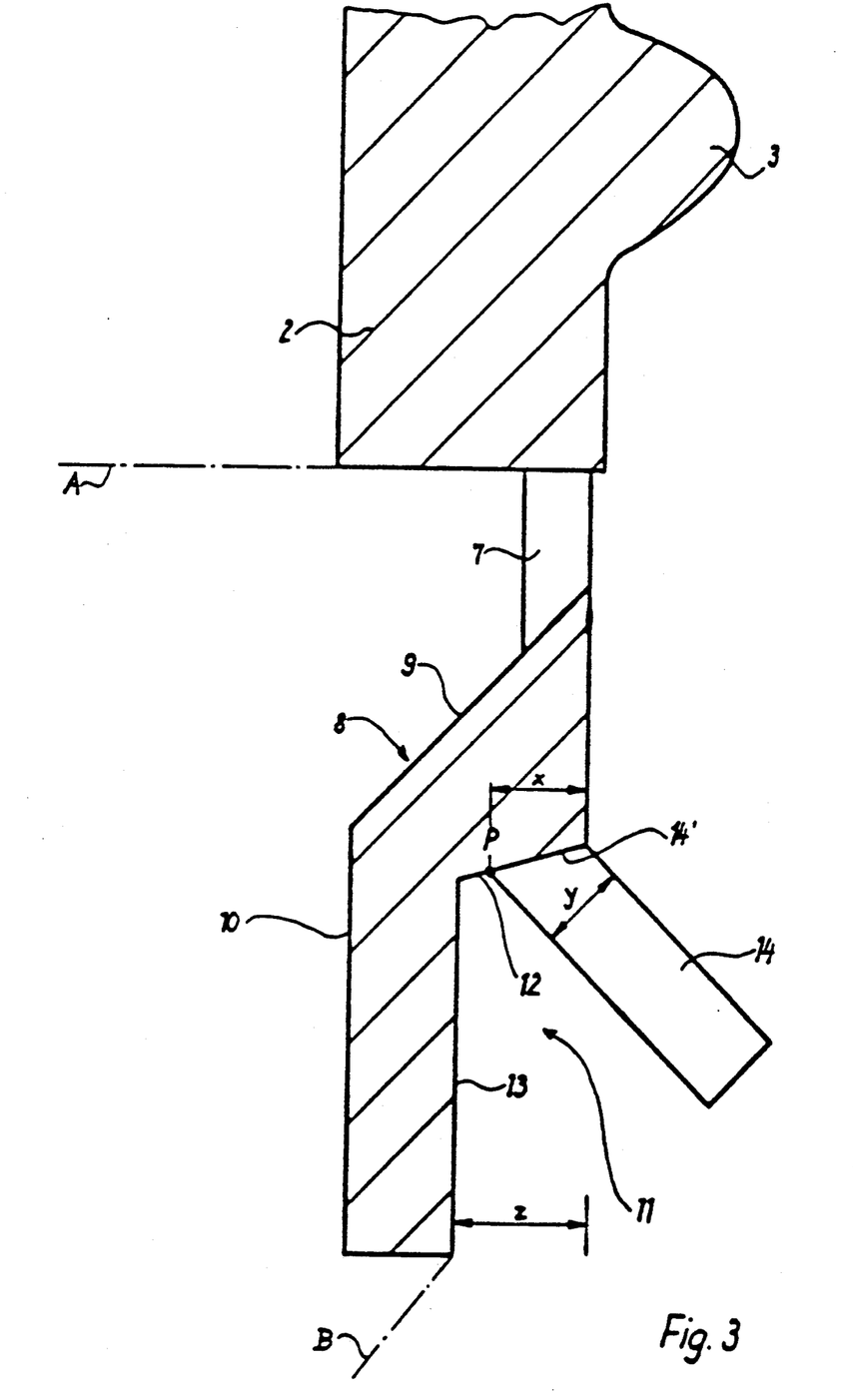
FIG. 3 shows a part of the closure cap and the pilfer-proof strip of the closure according to FIG. 1, in an enlarged axial section.

On its outside, and referring additionally to FIG. 3 the pilfer-proof strip 8 has an outer wall section 9 widening conically downwards from the webs 7 and an adjoining cylindrical outer wall section 10. On its inside, the pilfer-proof strip 8 is provided with a circumferential recess 11 which is bounded by an upper wall section 12 widening conically outwards and downwards from the inner wall of the pilfer-proof strip and a cylindrical lower wall section 13 adjoining this upper wall section. The circumferential recess 11 is thus open towards the lower end of the pilfer-proof strip. A plurality of retention fingers 14 distributed over the strip circumference project inwards from the upper inner wall section 12 of the pilfer-proof strip and, when the closure cap is screwed on (FIG. 1) engage beneath the snap-on projection 6 of the container. The pilfer-proof strip can furthermore have at least one vertical predetermined breaking point 15, which is shown in the right-hand half of FIG. 1 and in FIG. 2.

As can be seen from FIG. 3, each retention finger 14 extends from the upper wall section 12 of the circumferential recess 11 towards the interior of the pilfer-proof strip. In axial section, the retention finger 14 has parallel outer and inner faces and a body with the thickness "y". The base 14' of the retention finger 14 extends from the inner wall of the pilfer-proof strip as far as a point P on the upper wall section 12, the radial distance "x" of which from the inner wall is at least equal to the thickness "y" of the retention finger. As FIG. 3 furthermore shows, the radial depth "z" of the circumferential recess is greater than the radial distance "x". The above-explained design makes it possible to release the closure cap axially together with the pilfer-proof strip from an injection mould which, in axial section, has just two mould parting lines, namely the horizontal mould parting line A at the lower end of the cap shell and the mould parting line B running obliquely outwards and downwards which extends away from the lower inside edge of the pilfer-proof strip 8.

Within the scope of the invention, a plurality of retention fingers can be arranged at uniform intervals over the periphery of the pilfer-proof strip, as shown by FIG. 2. For satisfactory functioning, at least three retention fingers should be provided. Instead of individual fingers, it is also possible for sectors, or if desired, a single retention ring to be formed. It is essential that the depth "z" of the circumferential recess should be at least equal to the greatest width of the retention member in axial section in order to permit satisfactory mould release.

Figure 4:
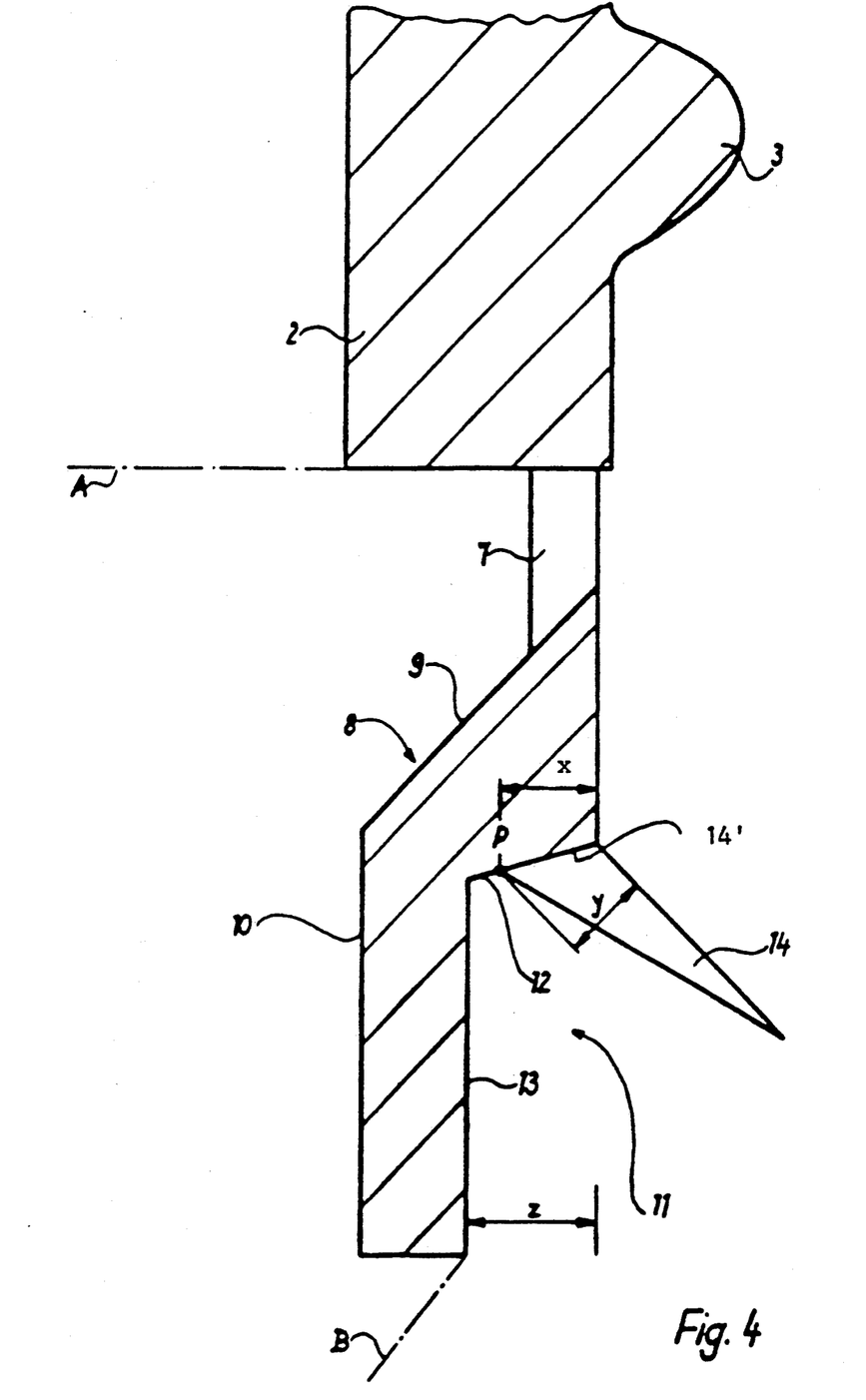
FIG. 4 shows a modified embodiment of the invention in an enlarged axial section.

In the exemplary embodiment represented in FIG. 4, the retention finger 14 is of triangular design in axial section, one triangle side coinciding with the upper wall section 12 of the circumferential recess 11.

Within the scope of the invention, the upper inner wall section 12 of the circumferential recess 11 may have a concave curvature towards the inside of the pilfer-proof strip rather than being conical. The cross-sectional shape of the retention fingers may furthermore deviate from that which is illustrated. The retention fingers may for example be of curved design.

Figure 5:
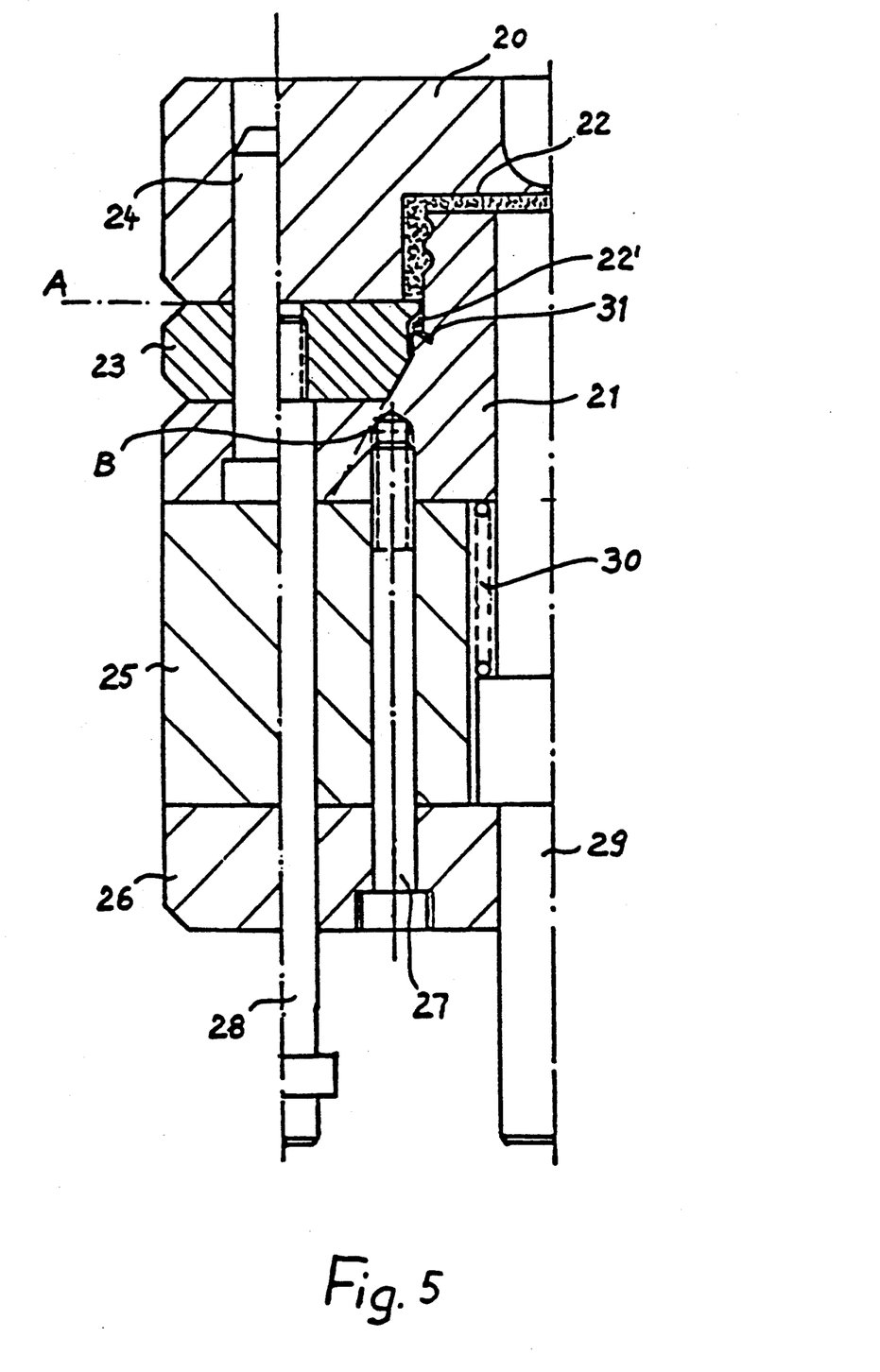
FIG. 5 shows an axial section through an injection mould according to the invention.

FIG. 5 shows the injection mould according to the invention in axial section. The mould has a cavity plate 20 and a mould core 21 which together delimit a mould cavity 22 for the closure cap proper. A stripper plate 23 is arranged below the cavity plate 20 and between the plate 20 and the mould core 21 which stripper plate 23, together with the mould core 21, delimits a mould cavity 22' for the pilfer-proof strip. The mould core 21, delimiting the cavity 22, the stripper guide bolts 24.

Adjoining the mould core 21 in the axially downward direction are a mould part 25 and a base plate 26, which are connected via fastening bolts 27 to the mould core 21. The mould parts 21, 25, 26 are traversed by a stripper rod 28 screwed into the stripper plate 23. An ejector pin 29, for which a restoring spring 30 is provided in mould part 25, can be displaced in the interior of the mould core 21 and in mould parts 25, 26.

In axial section, the injection mould thus has just two mould parting lines, namely the horizontal mould parting line A at the lower end of the cap shell between cavity plate 20, mould core 21 and stripper plate 23, and the mould parting line B which runs obliquely outwards and downwards between mould core 21 and stripper plate 23, this parting line extending away from the lower inside edge of the pilfer-proof strip 8.

The mould core 21 has a plurality of recesses 31 for the formation of the retention fingers 14, said recesses communicating with the mould cavity 22' above the mould parting line B, starting from a shoulder of the mould core and, in axial section, having parallel or downwardly converging sides.

Mould Release Opetation

Figure 6:
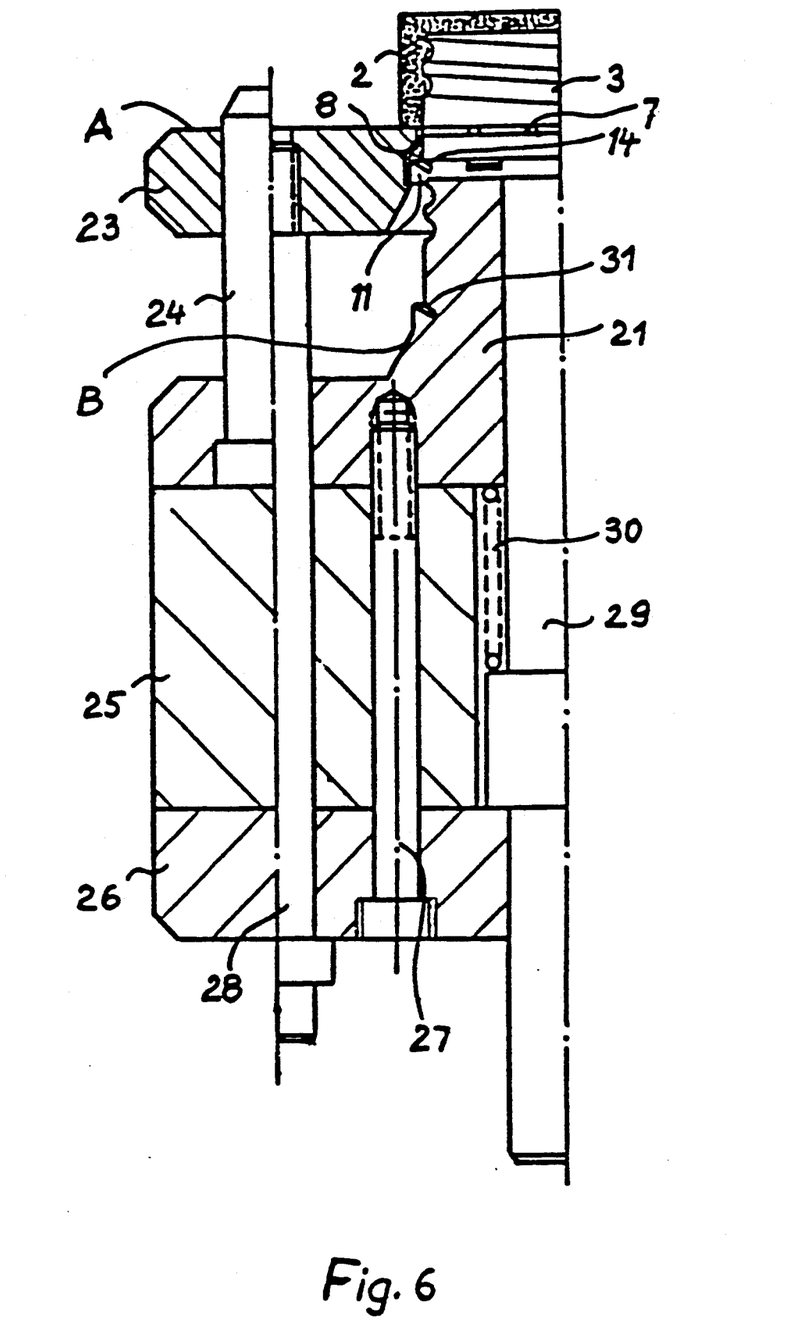
FIG. 6 shows an axial section through the opened injection mould prior to the ejection of the closure cap.

To release an injected closure cap 1, the cavity plate 20 is first of all moved axially upwardly. The stripper plate 23 is then likewise moved axially upwardly by upward movement of rods 28, and guided by bolts 24, as shown by FIG. 6, with the result that the cap together with the pilfer-proof strip moves axially upwardly relative to the mould core 21 at the same time the retention fingers 14 pivot elastically outwardly from of the recesses 31 of the mould core into the circumferential recess 11 of the now formed safety strip 8, which is progressively exposed by the mould core. The risk of the retention fingers 14 being sheared off.

The exemplary embodiment explained can be modified within the scope of the invention. If, instead of being conical, the upper wall section 12 of the circumferential recess 11 of the pilfer-proof strip has, for example, a concave curvature towards the inside of the pilfer-proof strip, the corresponding mould part is also curved. It would furthermore also be possible, as mentioned, for the retention fingers 14 and the recesses 31 to be of curved design.

I claim:

1. A pilfer-proof closure for containers, such as bottles and the like, having
   a closure cap (1) of plastic designed as a screw cap, the shell (2) of which is connected in the region of the inner circumference of the shell, via tear-off webs (7) to a pilfer-proof strip (8), the outside of which has a wall section (9) running obliquely outwardly and downwardly adjoining the webs and which on its inside bears at least one retention member (14) which extends into the inner space bounded by the pilfer-proof strip and, when the closure cap has been screwed onto the container orifice, engages beneath an annular snap-on projection (6) of the container arranged below the screw thread (5) of the container,
   the pilfer-proof strip having on its inside, in the region of the retention member, a circumferential recess (11) which is open towards the lower end of the pilfer-proof strip, which runs essentially axially and defines an upper wall section (12) and from the upper section (12) of which the retention member (14) extends,
   characterized in that
   in axial section, the retention member (14) has inner and outer faces and
   in that the radial depth (z) of the circumferential recess (11) is at least equal to the maximum width (x) of the retention member (14) in axial section.

2. The pilfer-proof closure according to claim 1, characterized in that three or more retention fingers (14) which are at a mutual circumferential interval are provided.

3. The pilfer-proof closure according to claim 1, wherein said inner and outer faces of the retention member (14) are parallel.

4. The pilfer-proof closure according to claim 1, wherein the inner and outer faces of the retention member (14) converge downwardly from the upper wall section (12).

5. The pilfer-proof closure according to claim 1, wherein the inner and outer faces of the retention member (14) converge downwardly from the upper wall section (12) and are of triangular cross section.

6. The pilfer-proof closure according to claim 2, wherein said inner and outer faces of the retention members (14) are parallel.

7. The pilfer-proof closure according to claim 2, wherein the inner and outer faces of the retention member (14) converge downwardly from the upper wall section (12).

8. The pilfer-proof closure according to claim 2, wherein the inner and outer faces of the retention member (14) converge downwardly from the upper wall section (12) and are of triangular cross section.

9. An injection mould for producing a pilfer-proof closure as claimed in claim 1,
   having
   a cavity plate (20) and a mould core (21) which together delimit a first mould cavity (22) for the closure cap (1) and can be moved relative to one another in axial direction upon release of the mould,
   an axially movable stripper plate (23) which, together with the mould core (21), delimits a second mould cavity (22') for the pilfer-proof strip communicating with said first cavity; and
   an ejector mechanism (29) for the closure cap,
   a first mould parting line (A) being formed between the cavity plate (20) and the stripper plate (23), said first parting line starting from the lower edge of the closure cap,
   characterized in that
   the stripper plate (23) and the mould core (21) adjoin one another along a second common mould parting line (B) which second parting line runs obliquely outwardly from the lower inside edge of the second mould cavity (22') for the pilfer-proof strip,
   in that the mould core (21) has at least one recess (31) for the formation of the retention member (14), said recess (31) communicating with the second mould cavity (22') for the pilfer-proof strip above the second oblique mould parting line (B), starting from a shoulder of the mould core and, in axial section, having sides which extend downwardly; and
   in that guide means (24, 28) are provided, guiding relative movement of said stripper plate (23) and said mould core (21) in axial direction to permit said retention members (14), when formed, to resiliently escape into the recesses (11) of the pilferproof strip (8).

10. The injection mould according to claim 3, characterized in that a plurality of recesses (31) are provided, arranged at uniform circumferential intervals and intended for the formation of finger-shaped retention members (14) are provided.

11. The injection mould according to claim 9, wherein said sides of the recess (31) for the formation of the retention fingers (14) extend downwardly and are parallel.

12. The injection mould according to claim 9, wherein said sides of the recess (31) for the formation of the retention fingers (14) extend downwardly and converge.

13. The injection mould according to claim 10, wherein said sides of the recess (31) for the formation of the retention fingers (14) extend downwardly and are parallel.

14. The injection mould according to claim 10, wherein said sides of the recess (31) for the formation of the retention fingers (14) extend downwardly and converge.

* * * * *